United States Patent
Loga et al.

(10) Patent No.: US 8,167,268 B2
(45) Date of Patent: *May 1, 2012

(54) DUAL CHAMBER ORIFICE FITTING PLATE SUPPORT

(75) Inventors: Thomas Henry Loga, Sugar Land, TX (US); Gary Allen Tatum, Houston, TX (US); Ronald Gwen Doom, Spring, TX (US); Mark O'Daniel, Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/786,151

(22) Filed: May 24, 2010

(65) Prior Publication Data

US 2010/0229988 A1 Sep. 16, 2010

Related U.S. Application Data

(63) Continuation of application No. 10/849,087, filed on May 19, 2004, now Pat. No. 7,837,176.

(51) Int. Cl.
*F16K 31/44* (2006.01)
(52) U.S. Cl. .................................. 251/250; 251/285
(58) Field of Classification Search .................. 251/250, 251/285, 326, 329
See application file for complete search history.

(56) References Cited

U.S. PATENT DOCUMENTS

| | | | |
|---|---|---|---|
| 1,058,092 A | 4/1913 | Pew et al. | |
| 1,698,314 A | 1/1929 | Mapelsden | |
| 1,792,950 A | 8/1929 | Welcome et al. | |
| 1,829,069 A * | 10/1931 | Standlee | 251/187 |
| 1,965,826 A | 7/1934 | Daniel | |
| 1,996,192 A | 4/1935 | Daniel | |
| 2,014,682 A * | 9/1935 | Greene | 138/44 |
| 2,127,501 A | 8/1938 | Dall | |
| 2,217,216 A | 10/1940 | Davis | |
| 2,306,940 A | 12/1942 | Fischer | |
| 2,626,820 A | 1/1953 | Dons et al. | |
| 2,687,748 A | 8/1954 | Whalen | |
| 2,688,987 A * | 9/1954 | Whalen | 138/44 |
| 2,942,465 A | 6/1960 | Carbone | |
| 3,381,532 A | 5/1968 | Tausch | |
| 3,419,247 A | 12/1968 | Bosi | |
| 3,822,592 A | 7/1974 | Siegel et al. | |
| 4,014,366 A | 3/1977 | Critendon | |
| 4,191,216 A | 3/1980 | Connolly | |
| 4,307,745 A | 12/1981 | McGee | |

(Continued)

OTHER PUBLICATIONS

FMC Measurement Solutions; FMC Energy Systems; Bulletin POR0001.00 Issue/Rev. 0.0 (7.01); (10 p.).

(Continued)

*Primary Examiner* — John Fristoe, Jr.
*Assistant Examiner* — Andrew J Rost
(74) *Attorney, Agent, or Firm* — Conley Rose, P.C.

(57) ABSTRACT

Methods and apparatus for positioning an orifice plate within a body having a straight flowbore. One embodiment includes a carrier supporting the orifice plate and a drive member operable to engage the carrier and move the carrier along a first axis perpendicular to the flowbore. The drive member is also operable to limit the movement of the carrier along a second axis perpendicular to the flowbore and perpendicular to the first axis. A pin is operable to engage the carrier so as to limit movement along the first axis.

29 Claims, 8 Drawing Sheets

U.S. PATENT DOCUMENTS

| | | |
|---|---|---|
| 4,410,010 A | 10/1983 | Van Scoy |
| 4,425,806 A | 1/1984 | Van Scoy |
| 4,444,224 A | 4/1984 | Geisow |
| 4,478,251 A | 10/1984 | Sanchez et al. |
| 4,633,911 A | 1/1987 | Lohn |
| 4,682,757 A | 7/1987 | Shelton |
| 4,750,370 A | 6/1988 | Ossyra |
| 5,069,252 A | 12/1991 | Kendrick et al. |
| 5,085,250 A | 2/1992 | Kendrick |
| 5,094,272 A | 3/1992 | Foster et al. |
| 5,181,542 A | 1/1993 | Wass et al. |
| 5,186,474 A | 2/1993 | Jacobs |
| 5,305,796 A | 4/1994 | Klak |
| 5,318,073 A | 6/1994 | Kendrick et al. |
| 5,474,103 A | 12/1995 | Klak |
| 5,546,990 A | 8/1996 | Wass et al. |
| 5,836,356 A | 11/1998 | Desai |
| 5,967,166 A | 10/1999 | Carter |
| 6,164,142 A | 12/2000 | Dimeff |
| 6,324,917 B1 | 12/2001 | Mack et al. |
| 6,467,504 B1 | 10/2002 | Bonicontro |

OTHER PUBLICATIONS

PCT/US2005/017078 International Search Report dated Apr. 16, 2007 (2 p.).

* cited by examiner

DUAL CHAMBER ORIFICE FITTING PLATE SUPPORT

CROSS-REFERENCE TO RELATED APPLICATIONS

The present application is a continuation of U.S. patent application Ser. No. 10/849,087, filed May 19, 2004, entitled "Dual Chamber Orifice Fitting Plate Support".

STATEMENT REGARDING FEDERALLY SPONSORED RESEARCH OR DEVELOPMENT

Not applicable.

BACKGROUND OF THE INVENTION

The invention relates to methods and apparatus for monitoring characteristics of a flow stream in a pipeline, in particular to dual chamber orifice fittings. More precisely, the embodiments of the invention relate to an improved system for positioning an orifice plate within the fitting.

In pipeline operations and other industrial applications, flow meters are used to measure the volumetric flow rate of a gaseous or liquid flow stream moving through a piping section. Flow meters are available in many different forms. One common flow meter is an orifice meter, which includes an orifice fitting connected to the piping section. The orifice fitting serves to orient and support an orifice plate that extends across the piping section perpendicular to the direction of flow stream. The orifice plate is generally a thin plate that includes a circular opening, or orifice, that is typically positioned concentric with the inner surface of the piping section.

In operation, when the flow stream moving through the piping section reaches the orifice plate, the flow is forced through the orifice, thereby constricting the cross-sectional flow area of the flow. Due to the principles of continuity and conservation of energy, the velocity of the flow increases as the stream moves through the orifice. This velocity increase creates a pressure differential across the orifice plate. The measured differential pressure across the orifice plate can be used to calculate the volumetric flow rate of the flow stream moving through the piping section.

A dual chamber orifice fitting embodies a special design that enables the orifice plate to be removed from the fitting without interrupting the flow stream moving through the piping section. This specially designed fitting has been known in the art for many years. U.S. Pat. No. 1,996,192, hereby incorporated herein by reference for all purposes, was issued in 1934 and describes an early dual chamber orifice fitting. Fittings with substantially the same design are still in use in many industrial applications today. Although the design has remained substantially unchanged, operating conditions continue to expand and dual chamber fittings are now available for piping sizes up to 48-inches in diameter and for working pressures up to 10,000 psi.

Figure 1:
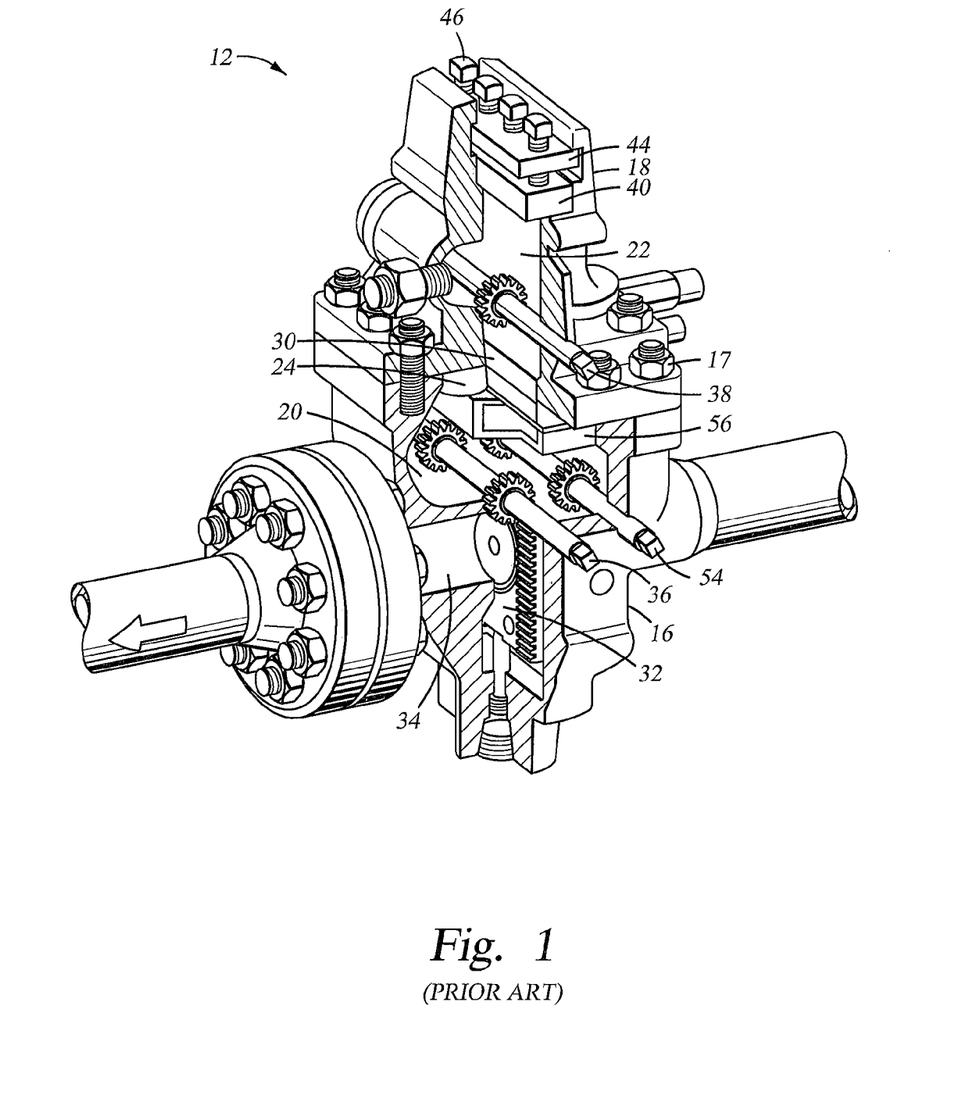
FIG. 1 is a partial sectional isometric view of a prior art dual chamber orifice fitting.

A common dual chamber orifice fitting 12 is illustrated in FIG. 1. Orifice fitting 12 includes body 16 and top 18. Body 16 encloses lower chamber 20 which is in fluid communication with the interior 34 of pipeline. Top 18 encloses upper chamber 22 and is connected to body 16 by bolts 17. Aperture 30 defines an opening connecting upper chamber 22 to lower chamber 20. Valve seat 24 is connected to top 18 and provides a sealing engagement with slide valve plate 56, which is slidably actuated by rotating gear shaft 54. Lower drive 36 and upper drive 38 operate to move orifice plate carrier 32 vertically within fitting 12.

Orifice 31 is located on an orifice plate 33 supported by orifice plate carrier 32. Orifice plate carrier 32 is shown in a metering position in aligmnent with bore 34. To remove orifice plate carrier 32 from fitting 12 the following steps are used. First, gear shaft 54 is rotated to slide valve plate 56 laterally and away from valve seat 24 and open aperture 30. Once aperture 30 is opened, lower drive 36 is actuated to move orifice plate carrier 32 upwards into upper chamber 22. Once orifice plate carrier 32 is entirely within upper chamber 22, aperture 30 is closed to isolate the upper chamber from bore 34 and lower chamber 20. Any pressure within upper chamber 20 can then be relieved and orifice plate carrier 32 can be removed from fitting 12 by loosening clamping bar screws 46 and removing clamping bar 44 and sealing bar 40 from top 18.

The location of the orifice 31 within bore 34 is closely controlled because any misalignment may cause inaccuracies in measuring the flow through the pipeline. American Petroleum Institute (API) 14.3 sets forth the dimensional standards and tolerances for the position of orifice 31 in bore 34. Compliance with the requirements of API 14.3 adds complexity to the manufacture of conventional dual chamber orifice fittings. Many conventional designs rely on precisely positioned surfaces inside body 16 to guide and position orifice plate carrier 32. Often, several machining steps are required to place these selected surfaces in the proper relationships in order to guarantee compliance with API 14.3.

Thus, there remains a need in the art for dual chamber orifice fittings providing improved orifice plate positioning systems. The embodiments of the present invention are directed to plate alignment apparatus for dual chamber orifice fittings that seek to overcome these and other limitations of the prior art.

SUMMARY OF THE PREFERRED EMBODIMENTS

The preferred embodiments include methods and apparatus for positioning an orifice plate within a body having a straight flowbore. One embodiment includes a carrier supporting the orifice plate and a drive member operable to engage the carrier and move the carrier along a first axis perpendicular to the flowbore. The drive member is also operable to limit the movement of the carrier along a second axis perpendicular to the flowbore and perpendicular to the first axis. A pin is operable to engage the carrier so as to limit movement along the first axis.

In one embodiment, an apparatus for positioning an orifice plate comprises a carrier supporting the orifice plate and a drive member adapted to engage the carrier and move the carrier in a first direction perpendicular to a flowbore. The drive member also limits the movement of said carrier in a second direction. The apparatus also includes a pin assembly adapted to limit the movement of the carrier in the first direction. In certain embodiments, the drive member comprises a shaft, a gear rotatably fixed to the shaft, and a cylindrical stuffing box engaging the shaft and having an outer diameter larger than the gear. The gear engages teeth disposed on the carrier. The stuffing box contacts a side of the carrier, which is perpendicular to the second direction, is connected to the body and sealingly engages the shaft. In certain embodiments, the pin assembly comprises a stop pin adapted to engage the carrier and a spanner nut attached to the body so as to limit the movement of the stop pin in the first direction. The pin assembly may also include a jack screw adapted to engage the spanner nut and move the stop pin in the first direction.

Thus, the embodiments of present invention comprise a combination of features and advantages that enable substantial enhancement of the operation of dual chamber orifice fittings. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Figure 2:
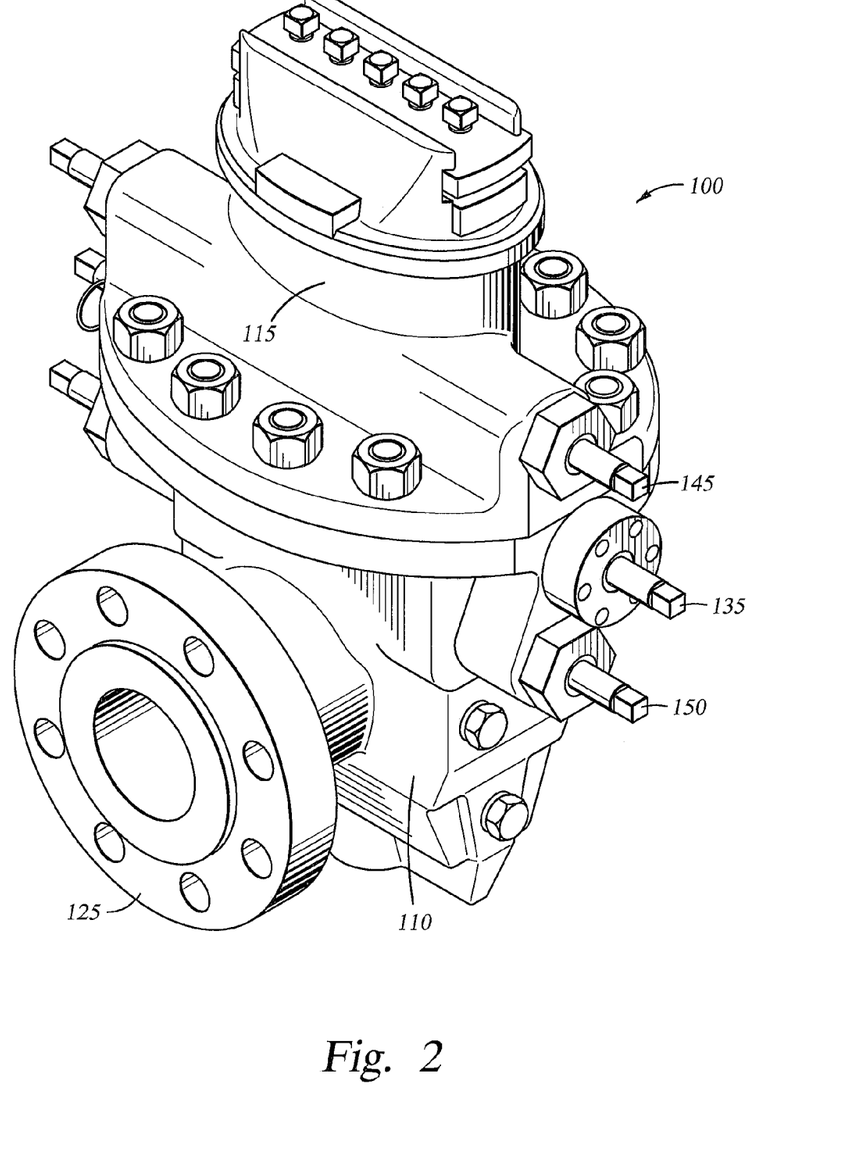
FIG. 2 is an isometric view of a dual chamber orifice fitting.
Figure 3:
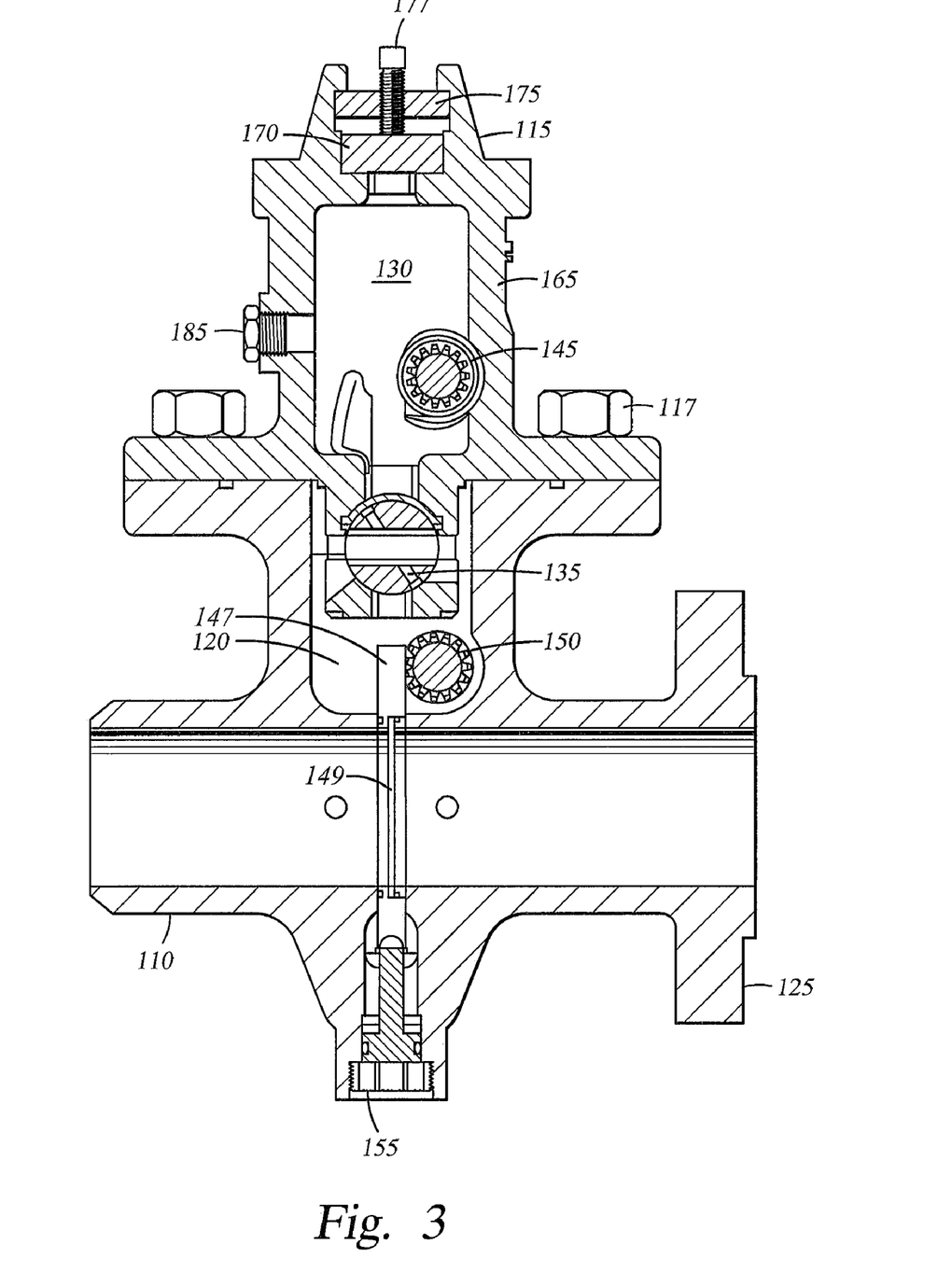
FIG. 3 is a cross-sectional view of the dual chamber orifice fitting of FIG. 2.

Referring now to FIGS. 2 and 3, one embodiment of a dual chamber orifice fitting 100 is shown. Fitting 100 includes body 110 and top 115 connected by bolts 117. Body 110 encloses lower chamber 120 and provides fluid communication with the interior of the pipeline by way of flange 125. Bottom pin assembly 155 seals the lower end of body 110. Top 115 encloses upper chamber 130 and includes aperture 140, which provides a passageway between the upper chamber and lower chamber 120.

Top 115 includes flange 160, for connecting with body 110, and wall 165 surrounding upper chamber 130. Upper chamber 130 is isolated from atmospheric pressure by sealing bar 170 and sealing bar gasket 172, which are retained with clamping bar 175 and clamping bar screws 177. Wall 165 supports upper drive assembly 145 and includes port 185, which provides access to upper chamber 130. A preferred body and top are further described in U.S. patent application Ser. No. 10/848,883, entitled "Dual Chamber Orifice Fitting Body,", which is incorporated by reference herein for all purposes.

Valve assembly 135 is used to open and close the aperture 140, allowing orifice plate carrier 147 to move between lower chamber 120 and upper chamber 130. One preferred valve assembly is described in U.S. patent application Ser. No. 10/848,883, entitled "Dual Chamber Orifice Fitting Valve,", which is incorporated by reference herein for all purposes. Orifice plate carrier 147 supports the orifice plate 149. Upper drive assembly 145 and lower drive assembly 150 are used to move orifice plate carrier 147 between lower chamber 120 and upper chamber 130 when valve assembly 135 is opened.

Figure 4:
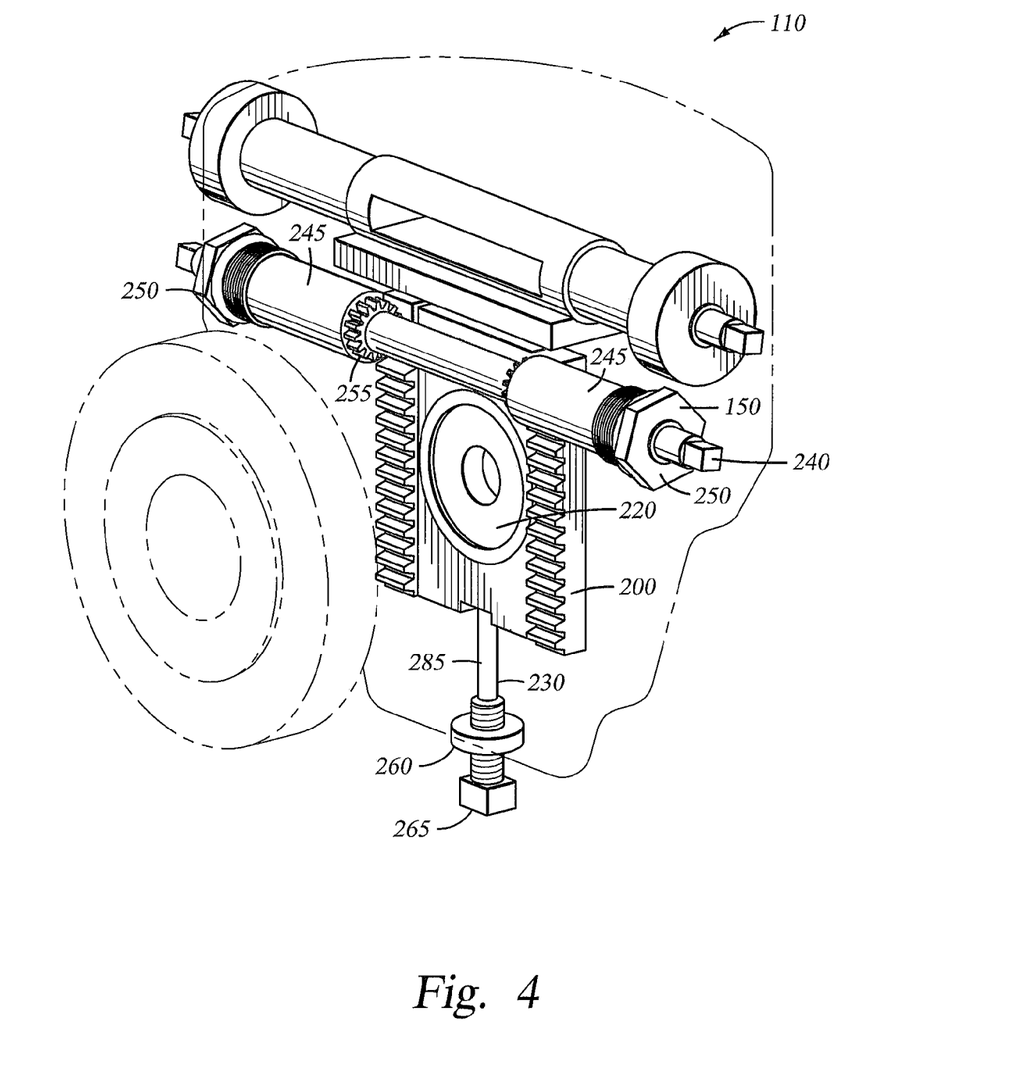
FIG. 4 is a partial sectional isometric view of one embodiment of a fitting having a plate positioning system in accordance with the present invention.

Referring now to FIG. 4, a partial-section isometric view of body 110 is shown revealing orifice plate carrier 200 with orifice plate 220, lower drive assembly 150, and bottom pin assembly 230. Plate carrier 200 is shown in the fully down position with orifice plate 220 axially aligned with the bore. It is in this position that pipeline flow measurements would be taken. Lower drive assembly 150 includes shaft 240, stuffing boxes 245, retainer nuts 250, and gears 255. Pin assembly 230 includes spanner nut 260, jack-screw 265, and stop pin 285. The horizontal position of carrier 200 is set by lower drive assembly 150 and the vertical position is set by pin assembly 230.

Figure 5:
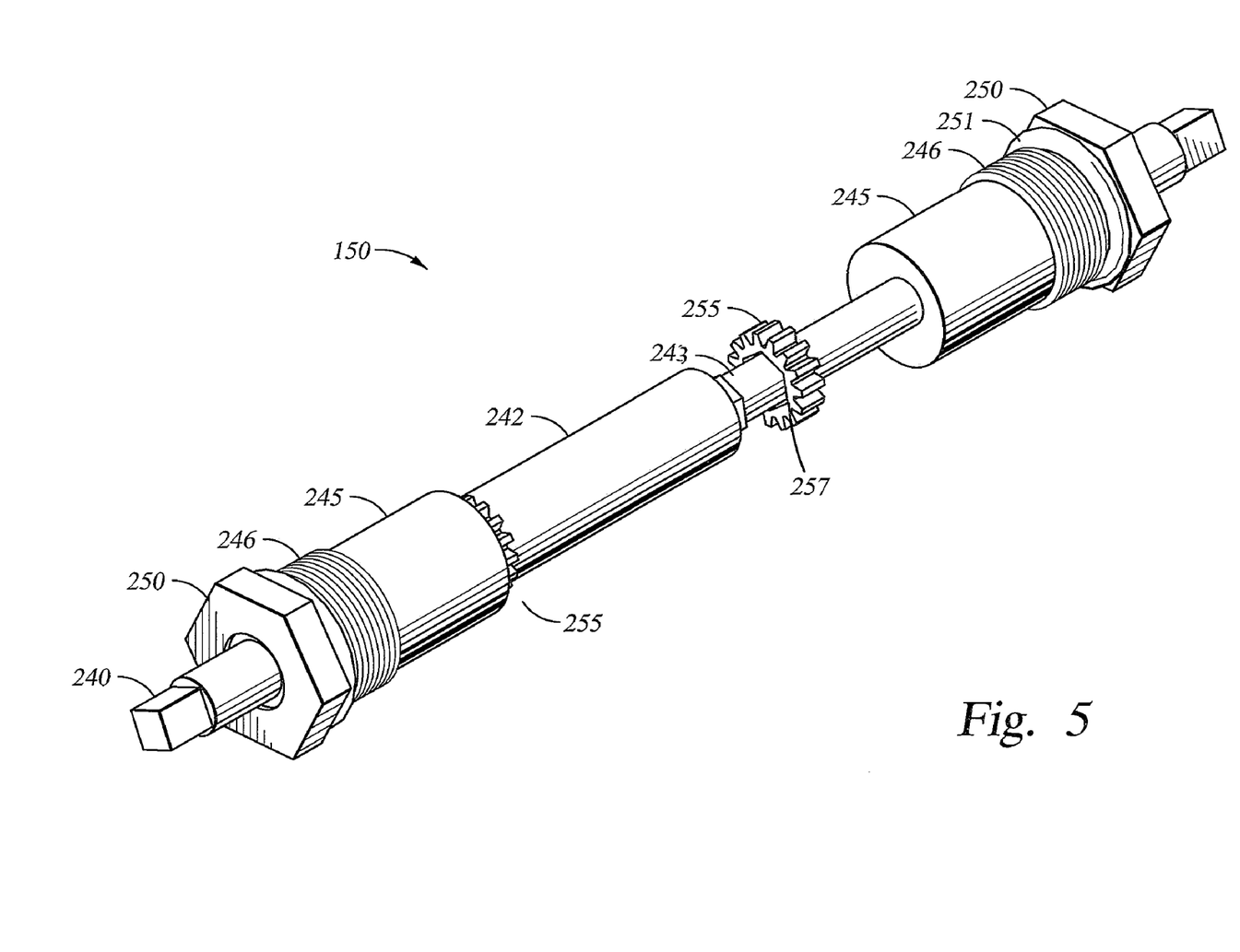
FIG. 5 is a magnified view of the system of FIG. 3.

Lower drive assembly 150 is shown in FIG. 5 and includes shaft 240, stuffing boxes 245, retainer nuts 250, and gears 255. Shaft 240 has a middle portion 242 with an increased diameter. On each side of middle portion 242 are rotational locators 243, such as keys or faceted surfaces, which interface with gears 255, which have a corresponding internal feature 257. Gears 255 slide onto shaft 240 and are rotationally constrained by locators 243. Gears 255 are preferably not permanently affixed to shaft 240.

Stuffing boxes 245 slide onto shaft 240 until they contact, and axially constrain, gears 255. The inside of stuffing boxes 245 have internal seals (not shown) that seal against shaft 240. The outer surface of stuffing boxes 245 have a threaded boss 246 that connects to corresponding threads on the body 110. Retainer nuts 250 on the outer end of stuffing boxes 245 are used to rotate the boxes and also hold in place seals 251 which seal between the stuffing boxes and the fitting body 110.

Figure 6:
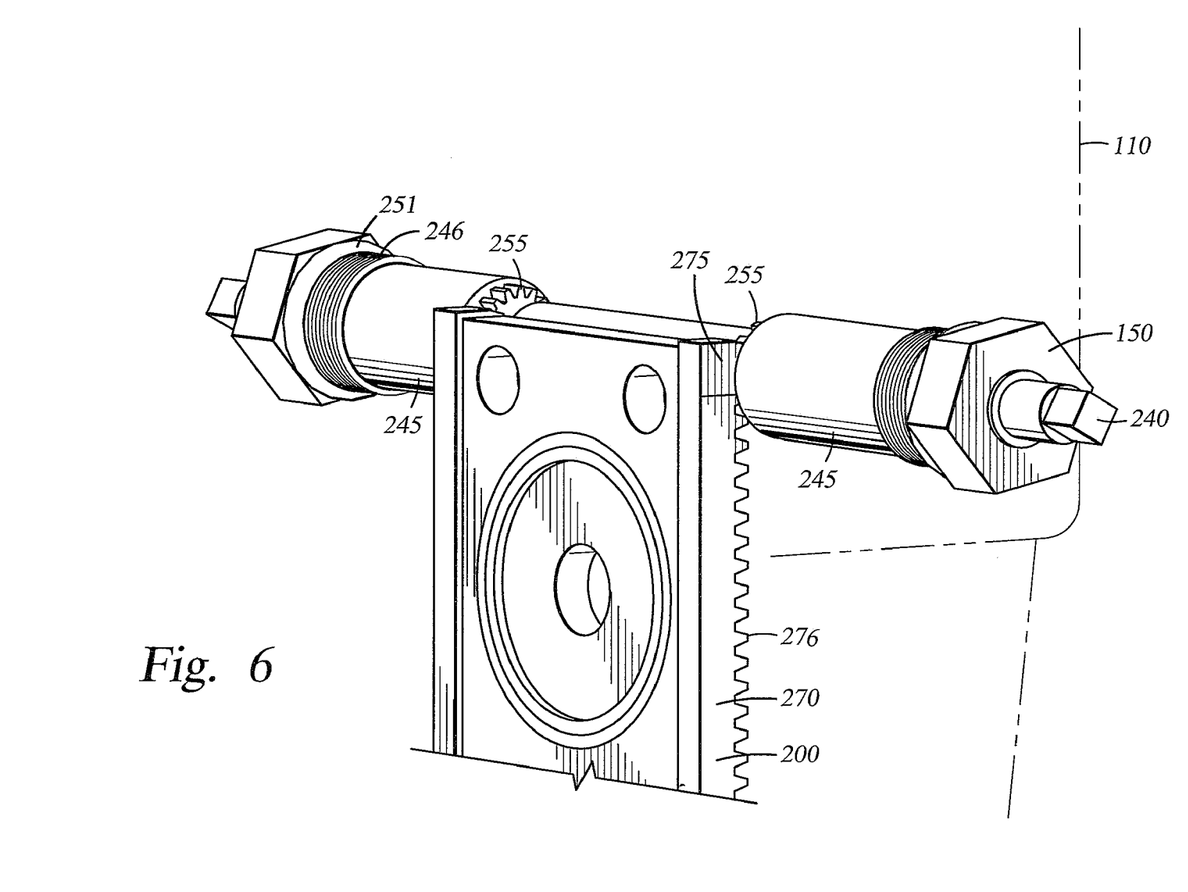
FIG. 6 is an isometric view of one embodiment of a lower drive system.

Referring now to FIG. 6, gears 255 engage teeth 276 on carrier 200 to move the carrier vertically as the gears are rotated. Stuffing boxes 245 on the outside edge of gears 255 have a larger diameter than the gears and thus engage the outer edges 270 of carrier 200. Outer edges 270 may also include machined surfaces 275 at the top of carrier 200. Machined surfaces 275 project above outer edges 270 to provide a surface that can be machined to a close tolerance, in order to establish the overall width of carrier 200. Although the entire length of outer edges 270 may be machined, surfaces 275 provide a localized area so as to minimize that the length of the outer edge that has a closely maintained tolerance.

Figure 7:
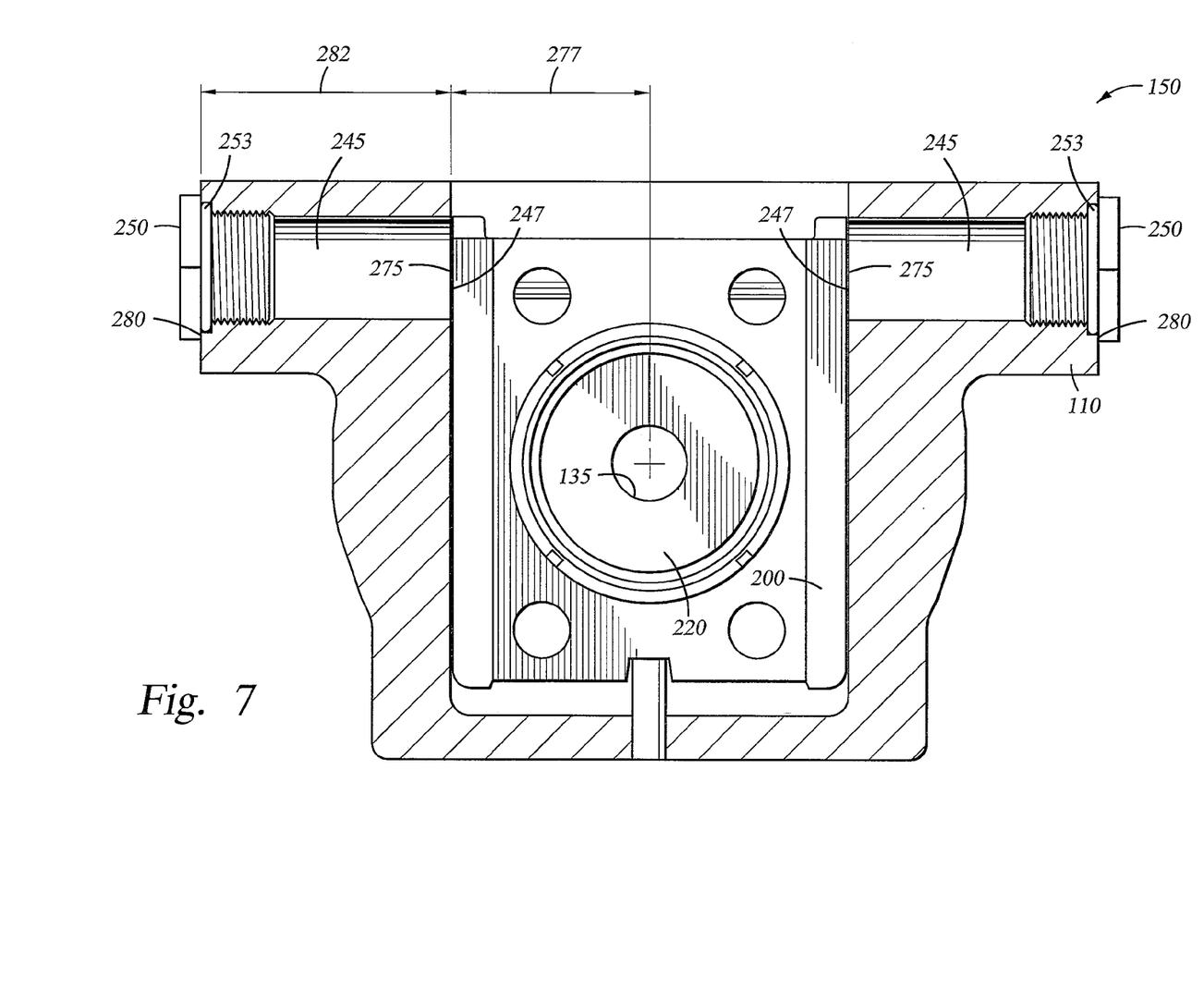
FIG. 7 is a partial sectional elevation view of a horizontal positioning system.

In accordance with API 14.3, the positioning of the orifice plate 220 within the flow bore must be closely controlled. Therefore, the relationship between carrier 200 relative to body 110 is preferably determined using machined surfaces, the dimensional tolerances of which can be tightly controlled. Referring now to FIG. 7, a cross-sectional view of body 110 including carrier 200 and lower drive assembly 150 is illustrated. The position of carrier 200 is controlled both vertically and laterally, relative to the cross-section plane of FIG. 7, so that orifice plate 220 is centered on the bore within the permissible limitations.

The lateral position of orifice plate 220 is determined by carrier 200 and its relationship to body 110, which is controlled by lower drive assembly 150. Machined surfaces 275 on carrier 200 establish the width of carrier 200 and define the distance 277 between the center of orifice plate 220 and the outermost edge of carrier 200. Machined surfaces 275 contact ends 247 of stuffing boxes 245. The distance 282 from the inner face 253 of retainer nut 250 to the end 247 of the stuffing box 245 is closely controlled as it is determined by the machined length of stuffing box 245. The lateral position of inner face 253 of retainer nut 250 is established by machined surfaces 280 on the outside of body 110, which, during manufacturing, can be precisely positioned relative to the center of the flow bore. Thus, carrier 200 is positioned using a combination of machined parts and surfaces, all of which can be closely controlled during manufacturing.

Figure 8:
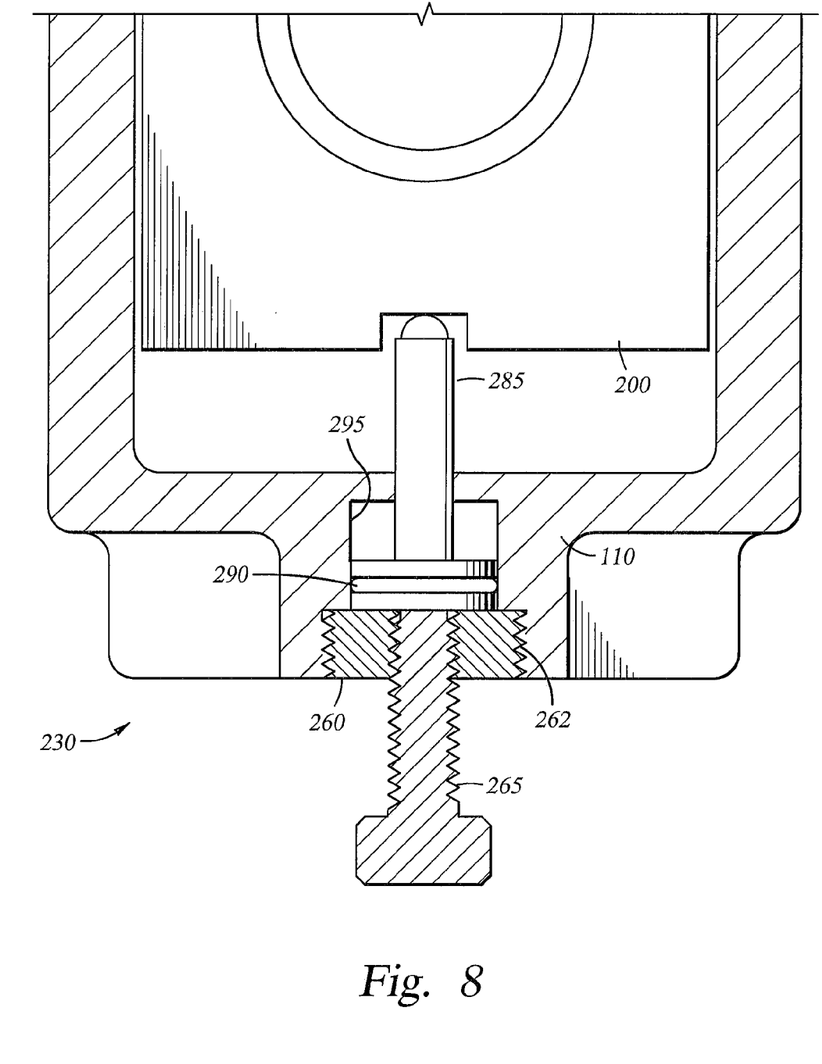
FIG. 8 is a partial sectional elevation view of a vertical positioning system.

The vertical location of carrier 200 is controlled by pin assembly 230. Referring now to FIG. 8, pin assembly 230 is shown supporting the bottom of carrier 200. Pin assembly 230 includes stop pin 285, spanner nut 260, and jack screw 265. Pin 285 includes seal 290 that sealingly engages seal bore 295 of body 110. Spanner nut 260 threadedly attaches to body 110 and includes threaded bore 262 accommodating jack screw 265. Pin 285 interfaces with slot 295 on carrier 200. The length of pin 285 and the vertical position of spanner nut 260 can be adjusted to control the vertical position of carrier 200. With spanner nut 260 engaged, pin 285 can be moved upward relative to body 110, by jack screw 265, without manipulating spanner nut 260. Thus, if carrier 200 were to become stuck in body 110, pin 285 can be moved upward by rotating jack screw 265 to push on the carrier without moving spanner nut 265, such that once jack screw 265 is lowered, pin 285 will return to its original position.

Thus, the combination of lower drive assembly 150 and pin assembly 230 provide both lateral and vertical positioning for orifice plate carrier 200. The positions of both lower drive assembly 150 and pin assembly 230 are established off of machined surfaces positioned on the outside of body 110.

The preferred embodiments of the invention relate to apparatus for positioning and moving an orifice plate within a dual chamber orifice fitting. The invention is susceptible to embodiments of different forms. There are shown in the drawings, and herein will be described in detail, specific embodiments of the invention with the understanding that the present disclosure is to be considered an exemplification of the principles of the invention, and is not intended to limit the invention to that illustrated and described herein. In particular, various embodiments of the invention provide a number of different arrangements to improve operation of the fitting. Reference is made to the application of the concepts of the invention to dual chamber orifice fitting with a plate orifice, but the use of the concepts of the invention is not limited to these applications, and can be used for any other applications including other dual chamber fittings and orifice fittings. It is to be fully recognized that the different teachings of the embodiments discussed below may be employed separately or in any suitable combination to produce desired results.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. An apparatus for positioning an orifice plate within a body having a straight flowbore, the apparatus comprising:
    a carrier supporting the orifice plate, wherein the carrier has a face normal to the axial centerline of the flowbore and two side surfaces extending normally from the face, wherein each side surface comprises a machined portion; and
    a drive assembly comprising a face engagement member coaxial with side engagement members, wherein the face engagement member engages the face whereby the carrier is moveable along a first axis normal to the centerline, and the side engagement members engage the pair of machined portions whereby the position of the carrier along a second axis normal to the first axis and to the centerline is controllable.

2. The apparatus of claim 1, wherein the center of the orifice plate aligns with the axial centerline of the flowbore relative to the second axis normal to the first axis and to the centerline.

3. The apparatus of claim 1, wherein the drive assembly is operable to engage teeth extending from the face during movement of the carrier along the first axis.

4. The apparatus of claim 3, wherein the drive assembly comprises a rotatable shaft and two gears fixed thereto, the gears engaging the teeth on the face.

5. The apparatus of claim 1, further comprising a stop pin operable to engage the carrier, whereby movement of the carrier along the first axis is controlled.

6. The apparatus of claim 5, further comprising a jack screw adapted to move the stop pin along the first axis.

7. The apparatus of claim 1, wherein the machined portions are equidistant from the center of the orifice plate as measured along the second axis.

8. The apparatus of claim 7, wherein the drive assembly comprises two stuffing boxes, each box having an inner face engaging one of the machined portions and equidistant from the centerline of the flowbore as measured along the second axis.

9. A dual chamber orifice fitting comprising:
    a body having an outer surface, a flowbore, an upper chamber, and a lower chamber, wherein the outer surface has two machined portions, each machined portion equidistant from the axial centerline of the flowbore as measured along a first axis normal to the centerline;
    a carrier disposed within the body and supporting an orifice plate, wherein the carrier has two faces, each face normal to the centerline, and two side surfaces, each side surface extending normally between the faces and comprising a machined portion, wherein the machined portions are equidistant from the center of the orifice plate as measured along the first axis; and
    a drive assembly disposed along the first axis and engaging at least one face of the carrier, whereby the carrier is moveable along a second axis normal to the first axis and to the centerline, and having two engagement surfaces, extending radially from the first axis, abutting the carrier machined portions, whereby the carrier machined portions remain equidistant from the body machined portions as measured along the first axis.

10. The dual chamber orifice fitting of claim 9, wherein the drive assembly comprises two gears engaging one face of the carrier, the gears rotatable to move the carrier along the second axis.

11. The dual chamber orifice fitting of claim 10, wherein the gears engage teeth on the face of the carrier.

12. The dual chamber orifice fitting of claim 9, wherein the drive assembly is operable to move the carrier along the second axis between the upper and lower chambers.

13. The dual chamber orifice fitting of claim 9, wherein the drive assembly comprises two stuffing boxes, each stuffing box comprising one of the engagement surfaces.

14. The dual chamber orifice fitting of claim 13, wherein the drive assembly further comprises two retainer nuts, each retainer threadably coupled to one stuffing box and having an inner face engaging one of the machined portions of the body.

15. A method for centering an orifice plate in a flowbore having an axial centerline, the method comprising:
   disposing a drive assembly on a shaft through a body comprising the flowbore, the drive assembly having two engagement surfaces;
   inserting an orifice plate carrier supporting the orifice plate into the body, wherein the orifice plate carrier has a face normal to the centerline and two side surfaces extending normally from the face;
   positioning the orifice plate carrier between the engagement surfaces;
   engaging the face of the orifice plate carrier with the drive assembly;
   rotating the drive assembly, whereby the orifice plate carrier is moved into the flowbore; and
   abutting the side surfaces of the orifice plate carrier with the engagement surfaces of the drive assembly, thereby aligning the center of the orifice plate carrier with the centerline of the flowbore.

16. The method of claim 15, wherein the engaging comprises:
   interlocking teeth on two gears of the drive assembly with teeth on the face of the orifice plate carrier.

17. The method of claim 15, wherein the disposing comprises:
   coupling two stuffing boxes about a rotatable shaft, wherein each of the stuffing boxes comprises one of the engagement surfaces;
   inserting the shaft through the body; and
   coupling the stuffing boxes to the body, thereby positioning one engagement surface a distance from a machined portion on the body and positioning the other engagement surface the same distance from another machined portion on the body.

18. The method of claim 17, wherein the rotating the drive assembly comprises rotating the shaft.

19. The method of claim 15, further comprising:
   forming a machined portion on each side surface, the machined portions equidistant from the center of the orifice plate.

20. The method of claim 19, wherein the abutting comprises:
   abutting one engagement surface with the machined portion of one side surface; and
   abutting the other engagement surface with the machined portion of the other side surface.

21. An apparatus for positioning an orifice plate within a dual chamber orifice fitting body having a flowbore, the apparatus comprising:
   a carrier supporting the orifice plate, wherein the carrier has a face normal to the axial centerline of the flowbore and two side surfaces, wherein each side surface includes a machined surface;
   a shaft having a longitudinal axis, the shaft coupled to and rotatably supported by the body; and
   two constraint members moveably disposed on the shaft, each constraint member including an inner end;
   wherein each inner end is engaged with one of the machined surfaces to constrain the carrier along the shaft axis.

22. The apparatus of claim 21, wherein the shaft is engaged with the face to move the carrier along a first axis normal to the centerline, and the position of the carrier relative to a second axis normal to the first axis and to the centerline is controllable by engagement between the constraint members and the carrier.

23. The apparatus of claim 21, wherein each constraint member is slidable on the shaft to axially constrain a gear, and each gear is operable to engage teeth extending from the face.

24. The apparatus of claim 21, wherein the shaft is rotatable to move the carrier along the first axis while the inner ends remain engaged with the machined surfaces to constrain the carrier along the shaft axis.

25. The apparatus of claim 21, wherein the constraint members comprise stuffing boxes rotatable about the shaft.

26. The apparatus of claim 25, wherein each of the stuffing boxes comprises:
   a threaded boss coupled to corresponding threads on the body;
   a retainer nut on an outer end to rotate the stuffing box; and
   a seal disposed between the stuffing box and the body.

27. The apparatus of claim 21, wherein each constraint member is machined to a controlled length.

28. The apparatus of claim 27, wherein a retainer nut is coupled to each constraint member, each retainer nut including an inner face engaged with an outer machined surface of the body.

29. The apparatus of claim 28, wherein the machined carrier surfaces, the machined constraint member lengths, and the machined body surfaces include dimensional tolerances closely controlled during manufacturing to position the carrier relative to the body and the axial centerline of the flowbore.

* * * * *